United States Patent [19]

Isler

[11] Patent Number: 5,548,901

[45] Date of Patent: *Aug. 27, 1996

[54] CENTERING TOOL FOR CYLINDER GAUGE

[76] Inventor: David J. Isler, 113 W. Church, Newton Falls, Ohio 44444

[*] Notice: The term of this patent shall not extend beyond the expiration date of Pat. No. 5,377,421.

[21] Appl. No.: 333,060

[22] Filed: Nov. 1, 1994

Related U.S. Application Data

[63] Continuation of Ser. No. 54,288, Apr. 30, 1993, Pat. No. 5,377,421.

[51] Int. Cl.$^6$ .................................................. G01B 5/12
[52] U.S. Cl. ..................... 33/542.1; 33/542; 33/501.3
[58] Field of Search .................................. 33/542, 542.1, 33/544.2, 544.5, 520, 501.3, 501.9, 544.3

[56] References Cited

U.S. PATENT DOCUMENTS

| | | | |
|---|---|---|---|
| 2,223,182 | 11/1940 | Muller | 33/542.1 |
| 2,470,635 | 5/1949 | Moss . | |
| 2,930,134 | 3/1960 | Bishop et al. | 33/544.5 |
| 3,836,277 | 9/1974 | Brooks . | |
| 4,754,551 | 7/1988 | Scott . | |
| 4,773,164 | 9/1988 | Taylor et al. | 33/520 |
| 4,977,681 | 12/1990 | Jiles | 33/544.5 |

FOREIGN PATENT DOCUMENTS

| | | | |
|---|---|---|---|
| 512736 | 9/1939 | United Kingdom | 33/542 |

OTHER PUBLICATIONS

*Nilco*, Nilsson Gage Co. Catalog, Merchants Press, Inc. Jun. 1953, pp. D1–D10.
Starrett Catalog, pp. 130–131, 364 (Date Unknown).
Mitutoyo Catalog, p. 285 (Date Unknown).

*Primary Examiner*—Christopher W. Fulton
*Attorney, Agent, or Firm*—Roger D. Emerson

[57] ABSTRACT

A centering tool that adapts to cylinder gauges to provide a fast, accurate one-time reading of the cylinder gauge. The centering tool provides adjustable interalignment elements to provide positive positioning of the gauge within the interior of the cylinder bore to determine the interior I.D. of the cylinder.

11 Claims, 2 Drawing Sheets

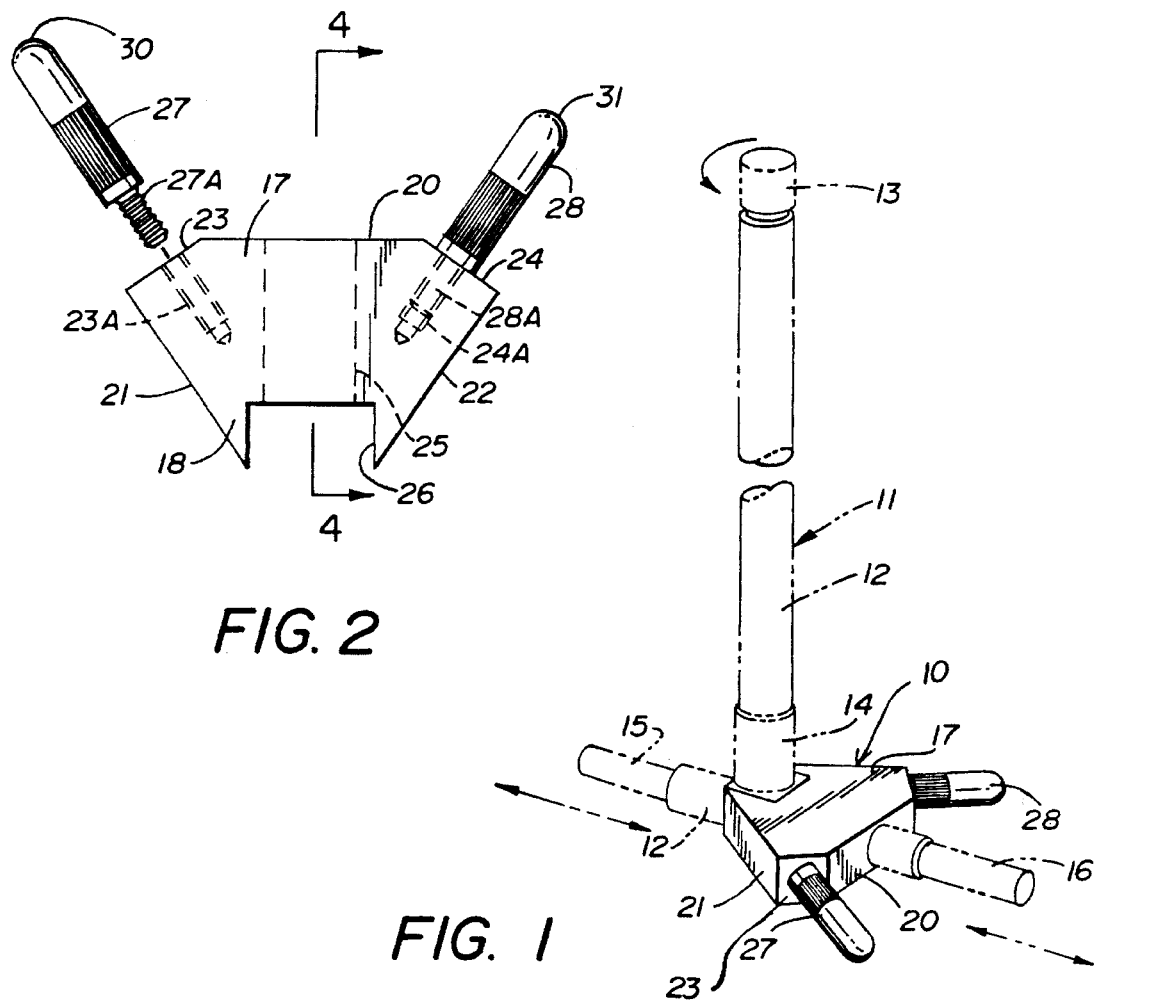
FIG. 2
FIG. 1
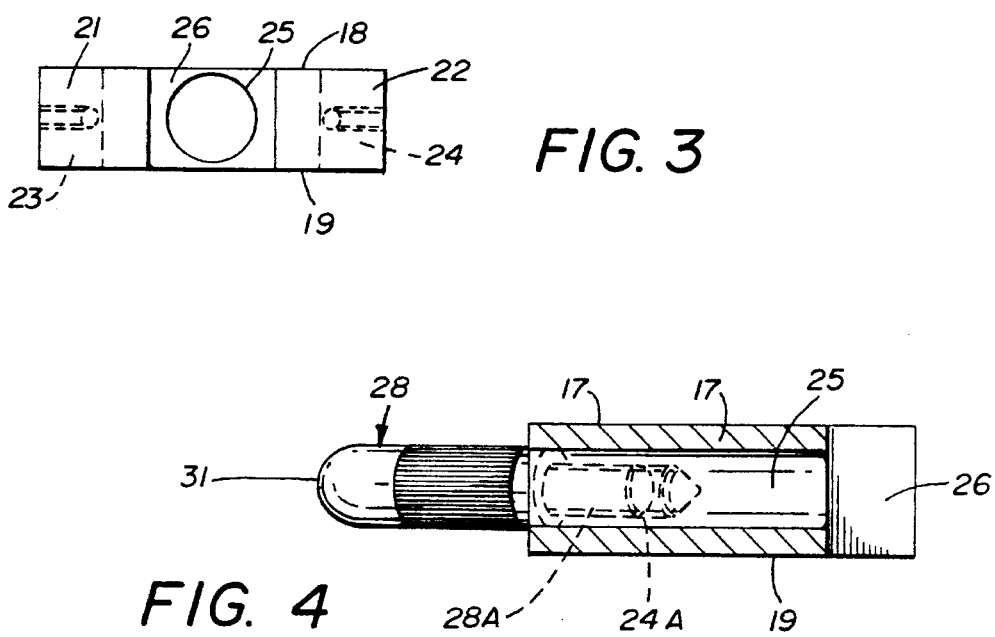
FIG. 3
FIG. 4

CENTERING TOOL FOR CYLINDER GAUGE

This application is a continuation of U.S. patent application Ser. No. 08/054,288 filed Apr. 30, 1993 now U.S. Pat. No. 5,377,421 issued Jan. 3, 1995.

BACKGROUND OF THE INVENTION

1. Technical Field

This device relates to telescopic gauges that are used to transfer the interdimensions of a cylinder for measuring purposes within thousandths of an inch.

2. Description of Prior Art

Prior art devices of this type have relied on a variety of different structural configurations that are adapted to provide automatic centering of measuring gauges within cylinders. Examples of such are U.S. Pat. Nos. 2,470,635, 3,836,277, 4,754,551 and 4,773,164.

Commercial examples of self-centering gauges are shown in cylinder gauges nos. 452B and 84 in Starrett®—catalog and bore gauge series 511–526 by Mitutoyo catalog, page 285.

Telescopic gauges of this type to which the invention is designed to adapt to are shown in Starrett® catalog, page 131 (telescopic gauge no. 829 and 579 series). The telescoping gauges no. 579 series are used to transfer internal measurements from the cylinder to be measured with precision calibers. These gauges have opposite telescopically extensible spring-urged contact plungers that can be locked once within the cylinder and then removed and measured.

In one form of applicant's invention, the centering tool is adapted to be fitted over and adapted to one of the plunger supports providing a pair of angularly offset guide pins to center the gauge within the cylinder without multiple efforts.

In cylinder bore gauges no. 164 of Mitutoyo reference 511-164 and 84 of Starrett page 364 series self-contained measuring gauges and cylinder engagement surfaces are shown wherein the gauges measure directly the distance between the contact points that extend outwardly from the gauge head. Bore gauge 84 series has a fixed pin opposite a measuring plunger with two positioning pins in offset angular relation thereto.

In U.S. Pat. No. 2,470,635 a gauge is positioned on a central shaft. The gauge has a pair of chucks with resilient jaws extending therefrom.

In U.S. Pat. No. 3,836,277 a centering tool is disclosed wherein a tool is centered within a cylinder by multiple pins on the respective spring-urged arms pivoted about and to the tool.

U.S. Pat. No. 4,754,551 is directed to a centering gauge tool in which multiple sensing fingers are mounted on a conical insert and expand outwardly to engage the inner surface, centering and measuring the tool.

In U.S. Pat. No. 4,773,164 a self-aligning caliber bar is disclosed in which two sets of aligned spaced pivoting fingers extend outwardly from a central mounting body to align same within a cylinder enclosure.

SUMMARY OF THE INVENTION

A centering device to pre-position a cylinder gauge within a cylinder to be measured. The centering device is adjustable to conform with multiple cylinder dimensions by a pair of interchangeable centering pins extending on either side of one of the gauges contact plungers providing a fast accurate one time positioning of the gauge within the cylinder.

DESCRIPTION OF THE DRAWINGS

FIG. 1 is a perspective view of a telescopic cylinder gauge with the invention position thereon;

FIG. 2 is an enlarged top plan view of the centering tool;

FIG. 3 is an enlarged front plan view of the centering tool;

FIG. 4 is an enlarged cross-sectional view on lines 4—4 of FIG. 2;

DESCRIPTION OF THE PREFERRED EMBODIMENT

Figure 5:
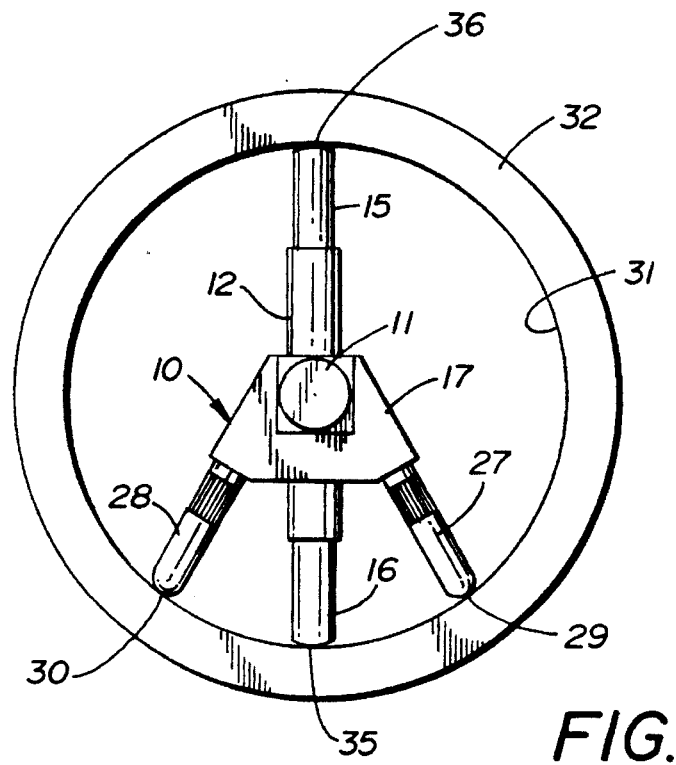
FIG. 5 is a top plan view of the centering device positioned on a telescopic gauge within a cylinder representation in use.

Referring to FIG. 1 of the drawings, a centering device 10 can be seen positioned on a telescopic gauge 11, shown in broken lines, having an elongated tubular handle portion 12 with a locking screw 13 on one end and a T-shaped mounting body 14 on the opposite end thereof. A pair of telescopically extensible contact plungers 15 and 16 are movably positioned within said mounting body 14 at right angles to said hereinbefore disclosed handle portion 12. The centering device 10 is shown positioned on the mounting body 14 and is best seen in FIGS. 2–4 of the drawings having a generally triangular mounting base 17 with corresponding parallel top and bottom surfaces 18 and 19. Multiple angular disposed side surfaces are defined on said mounting base 17 as a mounting surface 20, opposing angular inclined surfaces 21 and 22 and pin mounting surfaces 23 and 24 therebetween.

The mounting surface 20 has a bore 25 extending through said mounting base 17 exiting same within a notched area at 26 between said respective surfaces 21 and 22. Each of said pin mounting surface 23 and 24 have threaded bores 23A and 24A respectively for selective registration with centering pins 27 and 28, best seen in FIGS. 1,2,4, and 6 of the drawings. Each of the centering pins 27 and 28 have respective threaded mounting shafts 27A and 28A with rounded cylinder engagement oppositely disposed ends 30 and 31.

For use, the centering device is positioned over one end of the mounting body 14 by friction fit with the contact plunger 16 extending through the bore 25 within the notched area 26 abutting same adjacent the handle portion 12 hereinbefore described as seen in FIG. 1 of the drawings. Once positioned, the centering device 10 is integral with said telescopic gauge 11 as best seen in FIG. 1 of the drawings. The centering pins 27 and 28 are thus positioned in spaced offset angular relation to said contact plunger 16 defining a generally triangular configuration therebetween, best seen in FIG. 5 of the drawings. By defining multiple spaced fixed contact points 29 and 30 within an interior surface wall 31 of a cylinder 32, the telescopic gauge 11 is perfectly centered to obtain an accurate first time reading by engagement with the respective contact plungers 15 and 16 against the opposing interior surface wall 31 of the cylinder 32.

Figure 6:
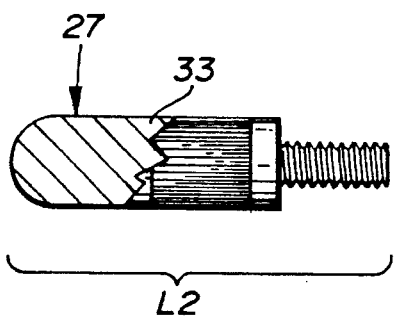
FIG. 6 is an enlarged side plan view of a guide pin.

Referring now to FIG. 6 of the drawings, a centering pin 27 can be seen with a portion in cross-section defining the solid nature of the centering pin construction at 33.

Figure 7:
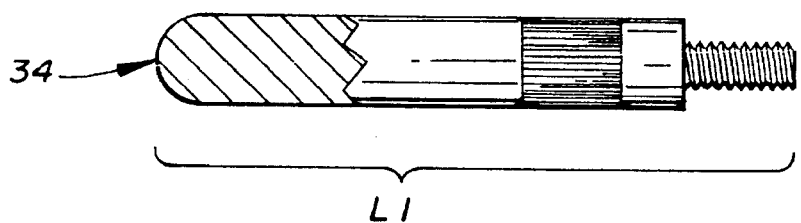
FIG. 7 is an enlarged side plan view of an alternate guide pin configuration.

Referring to FIG. 7 of the drawings, an alternate centering pin 34 can be seen wherein the overall length indicated by L1 is proportionally greater than that of the centering pins 27 and 28 as illustrated by L2 hereinbefore described.

It will be apparent to those skilled in the art that in order to accommodate a variety of cylinder sizes, alternate centering pins must be provided that will mount within the respective threaded bores 23A and 24A in said mounting body 17.

During the gauging of the cylinder, the telescopic gauge 11 with the centering device 10 of the invention attached will be automatically centered within the cylinder 32 by the centering pins 27 and 28 as hereinbefore described so that the contact plungers 15 and 16 will adjust to the interior surface wall 31 at aligned opposing contact points 35 and 36 then locked in that position by rotation of the locking screw 13. The telescopic gauge 11 is then removed from the cylinder 32 for measuring.

It will be evident to those skilled in the art that the centering device 10 can be permanently attached to the telescopic gauge 11 during manufacturing of same or alternately affixed to the telescopic gauge 11 as an aftermarket accessory as hereinbefore disclosed.

Thus, having illustrated and described my invention, it will be apparent to those skilled in the art that various changes and modifications may be made therein without departing from the spirit of the invention, therefore

I claim:

1. A centering tool for use with cylinder wall gauges of the type having a telescopically extensible plunger extending from a mounting body, said centering tool comprising:

a mounting base having spaced angularly disposed apertured pin mounting surfaces;

centering pins in fixed relation within said respective mounting surfaces; and, means for aligning and securing said centering tool on said mounting body of said cylinder wall gauge.

2. The centering tool of claim 1 wherein said means for aligning and securing said centering tool on said mounting body of said cylinder wall gauge comprises:

a bore extending through said mounting base and horizontally aligned with said centering pins; and, a notched area in said mounting body between said mounting surfaces and intersecting said bore in said mounting base.

3. The centering tool of claim 1 wherein said centering pins have threaded mounting shafts and rounded oppositely disposed end surfaces.

4. A centering tool gauge for use in measuring an inside diameter of a cylinder surface, said centering tool gauge comprising:

a mounting base, said mounting base having spaced apertured pin mounting surfaces, an elongated handle extending from said mounting base, a telescopically extensible contact plunger extending from said mounting base, locking means for locking said contact plunger in a fixed position, and centering pins registerable in fixed relation within said pin mounting surfaces, said centering pins being in offset angular relation to said contact plunger.

5. The centering tool gauge of claim 4 wherein said centering pins are removably positioned within said mounting surfaces.

6. In combination, a centering tool and a cylinder wall gauge for measuring inside diameters, said cylinder wall gauge comprising:

a mounting body; and a plunger extending from said mounting body;

said centering tool comprising:

a mounting base having spaced angularly disposed apertured mounting surfaces;

centering pins in fixed relation within said respective mounting surfaces; and, means for aligning and securing said centering tool on said mounting body of said cylinder wall gauge.

7. The combination of claim 6 wherein said mounting body is T-shaped.

8. The combination of claim 6 wherein said mounting body includes a tubular handle.

9. The combination of claim 6 wherein said mounting base has a bore therein, said bore being horizontally aligned with said centering pins.

10. The combination of claim 9 wherein said means for aligning and securing said centering tool on said mounting body comprises:

a notched area in said mounting body between said mounting surfaces and intersecting said bore in said mounting base.

11. The combination of claim 6 wherein said cylinder wall gauge is permanently attached to said centering tool.

* * * * *